United States Patent Office 3,634,347
Patented Jan. 11, 1972

3,634,347
ACRYLIC LACQUER COATING COMPOSITION CONTAINING A CONTROLLED QUANTITY OF LOW MOLECULAR WEIGHT MELAMINE-FORMALDEHYDE RESIN
Henry C. Kao, Dearborn, Mich., assignor to Inmont Corporation
No Drawing. Filed Oct. 10, 1969, Ser. No. 865,480
Int. Cl. C08b 21/08; C08f 45/34, 45/42; C08g 37/32
U.S. Cl. 260—15                                    7 Claims

ABSTRACT OF THE DISCLOSURE

An improved acrylic lacquer composition comprised of a vehicle or binder containing an acrylic copolymer and cellulose acetate butyrate in combination with a controlled proportion of a low molecular weight melamine resin which effects a modification and improvement of the heat distortion characteristics of the coating as applied to a substrate, as well as providing for an improvement in the resistance of the coating to cracking at low temperatures.

BACKGROUND OF THE INVENTION

Lacquer coating compositions are in widespread commercial use for forming durable finishes on various substrates in a variety of colors. Present-day lacquers incorporate acrylic polymers as the major film-forming constituent. The acrylic polymers employed contribute two important properties to such lacquer compositions, namely: good durability and gloss retention and good optical properties, enabling the preparation of varieties of glamourous colors utilizing unusual pigments, including metallic and transparent pigments for providing unusual esthetic effects.

In view of the durability and the versatility of acrylic-type lacquers, these coating compositions have been adopted in many instances for finishing automobile bodies. One continuing problem, however, has been a "heat distortion" phenomenon associated with acrylic lacquer films when the painted articles, such as automobiles, are subjected to intense sunlight in warmer climates, whereby the metallic body and the acrylic lacquer film thereon are heated frequently to temperatures within the range of 150° F. to 180° F. At such temperature levels, the acrylic lacquer, which is a thermoplastic material, heat softens and is susceptible, under such conditions, to cratering and marring as a result of contact with foreign abrasive particles or objects such as tree sap, sand, pebbles, etc. Such crater marks and other indentations result in permanent imperfections in the lacquer surface finish, detracting from its appearance.

In accordance with the present invention, all the advantages of acrylic-type lacquers have been retained, while a distinct improvement has been effected in the heat distortion characteristics of such acrylic lacquers by incorporating a controlled quantity of a specific low molecular weight melamine resin in the coating composition. In accordance with the improved coating composition of the present invention, an increase of about 20° F. in the heat distortion temperature of the resultant coating is attained, raising it to about 190° F., which is well above the maximum metal temperatures encountered in most exterior usages of acrylic-type lacquers. The inclusion of the melamine resin modifying agent does not detract from the other desirable physical characteristics of acrylic lacquers enabling patching and repair of previously painted surfaces without any noticeable demarcation in the new area spotted, as well as enabling such coatings to be "reflowed" at elevated temperatures, providing a self-polishing action.

SUMMARY OF THE INVENTION

The foregoing and other advantages and benefits of the present invention are achieved by a modified acrylic lacquer coating composition comprising a vehicle or binder containing from about 40% to about 60% by weight of an acrylic polymer or copolymer of an average molecular weight of from about 75,000 to about 500,000; from about 10% to 40% by weight of a specific cellulose acetate butyrate, from about 1% to about 5% of a melamine resin having an average molecular weight from about 400 to about 700 and up to 35% of a compatible plasticizer. The vehicle or binder constituent of the acrylic coating composition can readily be dissolved in a solvent system at a concentration so as to provide optimum spray or brush application thereof. In addition, any one of a variety of organic and inorganic pigmenting agents can also be satisfactorily incorporated in the coating composition to provide the desired physical properties and/or esthetic appearance of the resultant coating.

Additional benefits and advantages of the improved coating composition comprising the present invention will become apparent upon a reading of the description of the preferred embodiments taken in conjunction with the specific examples provided.

DESCRIPTION OF THE PREFERRED EMBODIMENTS

The proportions of the various constituents comprising the modified acrylic coating composition are herein described in terms of percentages by weight, unless clearly indicated otherwise.

The improved acrylic lacquer coating composition comprising the present invention broadly consists of a filler or pigment component, a compatible solvent and a film-forming vehicle or acrylic resin binder which predominantly comprises polymers in which the esters of acrylic and methacrylic acid predominate. Conventionally, one or more of a variety of well-known plasticizing constituents are also employed in the lacquer coating composition for effecting a modification of the properties of the resultant film and providing the desired flexibility and strength consistent with the intended end use of the coating.

For the purposes of the present invention, the vehicle contains, as its essential constituents, from about 40% to about 60%, and preferably from about 45% to about 55%, of an acrylic polymer or copolymer; cellulose acetate butyrate in an amount of about 10% to about 40%, and preferably from about 15% to about 30%; and a low molecular weight melamine resin present in an amount of about 1% to about 5%, and preferably 1½% to 3%. In addition to the foregoing, the vehicle constituent may conventionally contain plasticizers in amounts up to about 35%, and more usually in amounts of about 10% to 30% based on the total vehicle.

The acrylic constituent of the lacquer coating composition may comprise homopolymers or copolymers of the following monomeric materials including acrylic acid, methacrylic acid, methyl acrylate, methyl methacrylate, ethyl acrylate, ethyl methacrylate, isopropyl methacrylate, n-butyl acrylate, t-butyl methacrylate, cyclohexyl acrylate, cyclohexyl methacrylate, benzyl acrylate, benzyl methacrylate, n-hexyl acrylate, n-hexyl methacrylate, 2-ethyl hexyl acrylate, 2-ethyl hexyl methacrylate, lauryl methacrylate, stearyl methacrylate, etc., of which homopolymers and copolymers of methyl methacrylate, butyl methacrylate, isobutyl methacrylate and butyl acrylate are generally preferred. The acrylic polymers and/or copolymers which can be satisfactorily employed in accordance with the practice of the present invention are further characterized as those having an average molecular weight ranging from about 75,000 up to about 500,000 and which are substantially devoid of reactive groups disposed along their chain lengths for reaction with the low molecular weight melamine resin constituent.

The cellulose acetate butyrate (CAB) constituent suitable for use in the formulation comprising the present invention is one having a butyryl content of about 37% to about 53% and a hydroxyl content of from about 0.7% to about 2%. The viscosity of the cellulose acetate butyrate preferably is within a range of about one to three seconds as established by the Falling Ball test.

The third essential constituent of the vehicle of the improved coating composition comprising the present invention consists of a relatively low molecular weight melamine resin having an average molecular weight within the range of from about 400 up to about 700. Melamine resins suitable for this purpose include methylated melamine, n-butylated melamine, isobutylated melamine, n-butylated diallyl melamine, of which the n-butylated melamine and the isobutylated melamine constitute the preferred materials.

The significant improvement in the heat distortion temperature of the acrylic coating composition comprising the present invention, as well as an improvement in its resistance to low temperature cracking, is believed in part attributable to a cross-linking reaction which occurs during curing between the melamine resin and the cellulose acetate butyrate, forming a three-dimensional network through which the thermoplastic acrylic polymer and/or copolymer chains extend. The resultant cured film retains its thermoplastic properties, enabling touch-up and spot repair of such coatings without any visible demarcation between the originally painted surface and the spotted coating, which is extremely important in the manufacture of automobiles. The thermoplastic nature of the acrylic finishes of the present invention also enables a thermal reflow of the coating, resulting in a high gloss finish without requiring any buffing of the finish as formerly was required in connection with nitrocellulose-type lacquer compositions.

The ability to spot repair such finishes, particularly in automobile manufacture, constitutes an extremely important characteristic. In this connection, it has been found that when quantities of the melamine resin in excess of about 5% are used, the resultant cured film becomes excessively thermosetting in nature and prevents spot repair since the patched spot does not satisfactorily blend in with the initial coat. For this reason, the quantity of a melamine resin is limited to a maximum value of about 5% with amounts in the range of from about 1.5% to about 2.5% constituting a preferred range. The foregoing concentration of melamine resin, in combination with the specific type of cellulose acetate butyrate employed, provides a surprising improvement in the heat distortion properties of the final coating without appreciably affecting the other desirable thermoplastic characteristics of the acrylic coating composition.

In addition to the foregoing three essential constituents, the vehicle system of the acrylic coating composition may further contain any one of a variety of conventional plasticizers used in acrylic lacquers in amounts generally up to about 40% based on the weight of the vehicle. For most automotive-type finish applications, generally plasticizers in an amount of from about 10% to 30%, and more usually in an amount of about 20% to 30%, provide the best balance of physical properties. Typical of the plasticizers that can be satisfactorily employed are the monomeric plasticizers, as well as the polymeric plasticizers, of which the polymeric type are usually preferred due to their lower volatility. Examples of the various plasticizers suitable for use are butyl benzyl phthalate, dibutyl phthalate, butyl cyclohexyl phthalate, 2-ethyl hexyl benzyl phthalate, di-2-ethyl hexyl phthalate, di-iso-decyl phthalate, etc., as well as mixtures thereof.

In addition to the binding resin, the coating composition further includes a suitable solvent system which preferably is of the ester and ketone type and includes suitable aromatic-type solvents for facilitating a dissolving of the vehicle to the requisite viscosity for application to a substrate. Typical of the ester and ketone type solvents suitable for use are acetone, methyl ethyl ketone, methyl isobutyl ketone, cyclohexanone, isophorone, Cellosolve acetate, butyl acetate, butyl Cellosolve acetate, ethylene glycol diacetate, and the like. Typical of the aromatic solvents are toluene, benzene, xylene, trimethyl benzene, high flash aromatic naphtha, etc.

Conventionally, the coating composition is diluted with a solvent so as to provide a concentration of non-volatiles (N.V.) of between about 5% to about 30%. Concentrations of the foregoing type are suitable for applying the coating composition by any of the conventionally-known techniques including spray application, brushing, dipping, flooding, etc. Ordinarily, best spray application is provided at a non-volatile concentration of from about 15% to 20%, providing a viscosity of about thirty to about sixty seconds, as measured by a No. 1 Fisher Cup.

The remaining component of the improved coating composition comprises any one or mixtures of the various fillers and pigments either of an organic or inorganic type, which usually are employed in amounts up to about 5 parts by weight per part vehicle. The high loading of a coating composition with fillers and pigments in amounts up to and above 5 parts filler per part vehicle results in a reduction in the gloss of the final coating. However, such high loadings are acceptable in formulating primers and underlying sealing coatings in which gloss is an unimportant factor. Ordinarily for high-gloss finish or top coats, lower loading of fillers and pigments is preferred. Conventionally, in the compounding of white acrylic-type lacquers employing titanium dioxide as the inorganic pigment, it is usually preferred to employ about 0.4 up to about 0.6 part pigment per part vehicle. With metallic-type pigments, it is generally preferred to employ about 0.025 to about 0.1 part of the metallic pigment per part vehicle, thereby producing a high-gloss attractive coating.

It is also contemplated, in accordance with the practice of the present invention, that some low boiling alcohols can also be incorporated in small amounts as auxiliary solvents in the solvent system. Typical of such alcohols are isopropyl alcohol, butyl alcohol, ethyl alcohol, methyl alcohol, etc.

In order to further illustrate the coating composition comprising the present invention, the following examples are provided. It will be understood that the examples are furnished for illustrative purposes and are not intended to be limiting of the scope of the invention as set forth in the subjoined claims.

EXAMPLE I

An acrylic copolymer comprising 84% methyl methacrylate and 16% isobutyl methacrylate was prepared by forming a reaction mixture consisting of 780 grams of methyl methacrylate, 150 grams of isobutyl methacrylate, 418 grams of toluol, 394 grams of methyl ethyl ketone and 1.2 grams of 2,2'-azo-bis isobutyronitrile, which was charged into a reaction vessel and heated to reflux at about 190° F. A second mixture was prepared containing 630 grams of methyl methacrylate, 120 grams of isobutyl methacrylate, 508 grams of toluol, 168 grams of methyl ethyl ketone and 4.6 grams of 2,2'-azo-bis isobutyronitrile, which was slowly added to the first mixture at a uniform rate over a period of about two hours, whereafter refluxing was continued for an additional thirty-minute period. Thereafter, 1.2 grams of 2,2'-azo-bis isobutyronitrile and 28 grams of toluol, and 20 grams of methyl ethyl ketone was added to the polymerization mass over a thirty-minute period and heating at reflux was continued for an additional four-hour period. At the completion of the reaction, 777 grams of toluol were added, resulting in an acrylic copolymer solution containing 40% nonvolatiles, having a viscosity of X on the Gardner bubble viscosimeter scale, and wherein the solvent system comprised 75% toluol and 25% MEK.

A commercially available cellulose acetate butyrate designated as EAB–381–2 from Eastman Chemical was provided having an acetyl content of 13%, a butyryl content of 37%, a hydroxyl content of 2%, and a viscosity range of 1–3 seconds as measured by the Falling Ball. The cellulose acetate butyrate was dissolved in a solvent blend consisting of 70% acetone and 30% Cellosolve acetate to form a solution containing 25% solids.

A polymeric plasticizer was prepared by reacting 388 grams of pelargonic acid, 219 grams of phthalic anhydride and 304 grams of 2,2 dimethyl-3-hydroxylpropyl 2,2-dimethyl-3-hydroxypropionate and 89 grams of pentaerythritol at 440° F. to an acid number of 8. The resultant polymeric plasticizer solution contained 94% solids in a xylol solvent at a viscosity of Z2.

A low molecular weight isobutylated melamine resin was prepared by forming a reaction mass in which the melamine-formaldehyde-isobutanol were present in mole ratios of 1.0:8.0:18.0. The reaction mass was prepared by mixing 1200 grams of a mixture containing 40% formaldehyde, 52% isobutyl alcohol and 8% water; a 10% caustic solution in an amount of 2.3 grams, 252 grams melamine, 2036 grams isobutanol and 90 grams of concentrated sulfuric acid. The reaction procedure is initiated by charging the kettle with the isobutyl alcoholformaldehyde mixture and the aqueous caustic solution to adjust the pH to a range within 8.5 to 9.5. Thereafter, the melamine is added and the reaction mass cooked at a reflux temperature of about 98° C. to 100° C. for approximately one-half hour. Thereafter, the entire amount of the isobutanol is added and after cooling to about 30° C., the concentrated sulfuric acid is added over a period of about fifteen minutes. The reaction mass thereafter is further agitated until the solution becomes clear, whereafter a 50% aqueous caustic solution in an amount of 142 grams is added so as to neutralize the sulfuric acid and provide a pH of about 8.5 to 9.5.

The resultant reaction mass is thereafter water-washed to remove the sodium sulfate salt formed and the excess isobutanol and water are thereafter stripped by vacuum distillation, providing a substantially clear resin with a yield of about 1580 grams of a 62% solids solution. The resultant low molecular weight melamine resin solution is further characterized as having a water white color and a viscosity of A on the Gardner scale.

The acrylic copolymer, cellulose acetate butyrate, polymeric plasticizer and low molecular weight melamine resin were employed to formulate a clear lacquer coating composition and a similar three component acrylic lacquer devoid of the low molecular weight melamine resin to enable comparative evaluation. The composition of the control sample A devoid of melamine resin and the improved modified acrylic lacquer composition designated as sample B is set forth in the following table.

|  | Percent by weight (solids basis) | |
| --- | --- | --- |
|  | Sample A | Sample B |
| Acrylic polymer | 50 | 48.5 |
| CAB | 24 | 24 |
| Plasticizer | 26 | 26 |
| Melamine resin |  | 1.5 |
| Total | 100 | 100 |

The proportions of the various constituents as set forth above are provided on a solids basis. The lacquer coating compositions were further reduced with a solvent blend consisting of 70% toluol and 30% Cellosolve acetate to provide a resultant viscosity of 45–50 seconds, as measured by a No. 1 Fisher Cup corresponding to a viscosity of about 30 centipoises. The coating compositions were not pigmented for initial test purposes. Both sample A and B compositions were spray applied over bare and primed metal substrates and were baked at 300° F. for a period of thirty minutes to effect a curing thereof. The resultant films produced were observed to be glossy and hard without requiring any supplemental polishing. The defects or imperfections on the surfaces were observed to be able to be spot repaired with the same lacquer coating composition without showing any patching or demarcation.

In order to evaluate the improved heat distortion properties of the lacquer coating composition as typified by sample B, simulated heat distortion tests were conducted comparing panels that had been coated with compositions corresponding to samples A and B. The material employed for these tests consisted of a 5% solution of egg albumin in distilled water, which is intended to simulate the chemical effect of tree sap falling on a hot finish which heretofore has occasioned cratering and marketing of automobile lacquer finishes. The coatings were applied to an aluminum panel and thereafter baked for a period of thirty minutes at 300° F. The panels thus coated were preheated on a gradient bar, providing differential temperatures of from 115° F. up to 220° F. and beads of the egg albumin solution were applied at various locations along the panels to determine the temperature at which substantially no etching of the coating finish occurred. According to these test results, sample A, which is devoid of the low molecular weight melamine resin, had a heat distortion temperature level in the range of about 150°–160° F., resulting in cratering or marking of the surface finish when the panel was at temperatures above about 160° F. In comparison, sample B incorporating the low molecular weight melamine modifier had heat distortion temperatures in the range of about 170°–190° F., which is approximately 20 to 30 degrees higher than that of sample A.

Panels coated with the composition of samples A and B were also subjected to ultraviolet and cold crack resistance evaluations. Test results to date have indicated that the sample B lacquer showed little or no cracking when subjected to outdoor weathering tests at low temperatures, whereas the sample A coated panels showed definite cracking.

EXAMPLE II

The modified acrylic lacquer coating composition corresponding to sample B of Example I is employed for forming appropriate colored acrylic lacquers by first dispersing an appropriate transparent or opaque pigment in the composite vehicle or in any one of its components using a sand mill, ball mill, etc., forming a mill paste. For iridescent colors, the transparent pigment pastes are further admixed with aluminum powder, or paste, and then reduced down to the proper color strength with the composite vehicle. The solid color lacquers are prepared by admixing the opaque pigment pastes with composite vehicle to their desired hiding strength. The pigmented lacquers are applied to the surface of panels in the same manner as described in Example I and are observed to possess similar properties to that of the clear lacquer composition.

EXAMPLE III

A modified acrylic coating composition is prepared similar to that described in Example I but wherein a copolymer of methyl methacrylate and butyl methacrylate in a weight ratio of 84% to 16% is employed and is polymerized in a manner similar to that described in connection with the methyl methacrylate-isobutyl methacrylate copolymer. The characteristics of the copolymer are similar and the solution has a viscosity of W as measured by a Gardner bubble viscosimeter. Coating compositions prepared using this acrylic copolymer in proportions of from about 40% to about 60% in combination with about 1% to 5% of the melamine resin with up to 35% of the polymeric plasticizer and with from 10% to 40% of cellulose acetate butyrate provided a family of acrylic lacquers, all of which possess improved heat distortion characteristics in comparison to lacquer coating compositions of the types heretofore known, devoid of the melamine resin modifying agent.

EXAMPLE IV

An acrylic copolymer comprising a 50/50 weight ratio of methyl methacrylate-isobutyl methacrylate is prepared in a manner similar to that described in Example I employing a benzoyl peroxide initiator providing a resultant solution containing 37.8% solids and having a viscosity of T as measured on the Gardner scale. This acrylic copolymer is employed to form improved acrylic lacquers in a manner as described in Example III.

EXAMPLE V

A homopolymer of methyl methacrylate is prepared in a solvent blend consisting of 89% methyl ethyl ketone and 11% toluol using benzoyl peroxide as the initiator and employing the conditions as generally set forth in Example I. The resultant methyl methacrylate acrylic polymer solution has a solids content of 37% and a viscosity of Z-1 on the Gardner scale. This acrylic polymer is employed for formulating acrylic lacquer coating compositions in which the cellulose acetate butyrate is varied over a range of 10% to 40%, the melamine resin is varied over a range of from 1% to 5%, and the plasticizer is varied within a preferred range of from 10% to 30%. The acrylic coating compositions provide improved heat distortion properties in comparison to similar type acrylic lacquer coating compositions devoid of the melamine resin modifying agent.

EXAMPLE VI

A copolymer containing a 50/50 weight ratio of methyl methacrylate and butyl acrylate is prepared in accordance with the description as provided in Example I using benzoyl peroxide as the initiator and producing a solvent solution of the copolymer containing 39.6% solids and having a viscosity of Q on the Gardner scale. This methyl methacrylate/butyl acrylate copolymer is employed for forming a series of improved acrylic lacquer compositions incorporating the low molecular weight melamine resin and providing films possessing improved heat distortion characteristics.

While it will be apparent that the description of the preferred embodiments and the specific examples provided are intended to provide improved acrylic lacquer formulations which achieve the benefits as hereinbefore enumerated, it will be understood that the invention is susceptible to modification, variation and change without departing from the spirit thereof.

What is claimed is:

1. An acrylic lacquer coating composition comprising a solvent mixture containing a composite vehicle consisting essentially of about 40% to about 60% of an acrylic polymer of an average molecular weight of about 75,000 to about 500,000 and which is substantially devoid of any reactive groups along the chain length thereof, about 10% to about 40% of cellulose acetate butyrate having a hydroxyl content of from about 0.7% to about 2% and a butyryl content of about 37% to about 53%, and about 1% to about 5% of a reactive melamine-formaldehyde resin selected from the group consisting of methylated melamine-formaldehyde, n-butylated melamine-formaldehyde, isobutylated melamine-formaldehyde, n-butylated diallyl melamine formaldehyde and mixtures thereof having an average molecular weight of about 400 to about 700 and adapted to react with said cellulose acetate butyrate during the curing of said coating composition.

2. The coating composition as defined in claim 1, wherein said composite vehicle further contains a compatible plasticizer in an amount up to about 35%.

3. The coating composition as defined in claim 1, wherein said composite vehicle contains said melamine resin in an amount of from about 1.5% to about 3%.

4. The coating composition as defined in claim 1, wherein said composite vehicle consists essentially of 45% to 55% of said acrylic polymer, 15% to about 30% of said cellulose acetate butyrate, 1.5% to about 3% of said melamine resin and from about 10% to about 30% of a compatible plasticizer.

5. The coating composition as defined in claim 1, wherein said composite vehicle is present in an amount of from about 5% to about 30% based on the total weight of said mixture.

6. The coating composition as defined in claim 1, further including solid particulated fillers and pigments in amounts up to five parts by weight per part of said composite vehicle.

7. The coating composition as defined in claim 1, wherein said melamine resin is selected from the group consisting of isobutylated melamine formaldehyde and n-butylated melamine formaldehyde and mixtures thereof.

References Cited

UNITED STATES PATENTS 2,849,409   8/1958   Evans _____ 260—16
3,411,941   11/1968  Lowe  _____ 260—15

WILLIAM SHORT, Primary Examiner

E. WOODBERRY, Assistant Examiner

U.S. Cl. X.R.

117—127; 260—31.4, 32.8